(12) United States Patent
Roemer et al.

(10) Patent No.: US 7,937,883 B2
(45) Date of Patent: May 10, 2011

(54) FISHING ROD CARRIER AND HOLDER DEVICE

(76) Inventors: Brian G. Roemer, Bridgewater, NJ (US); Anthony Russell Prasa, High Bridge, NJ (US)

( * ) Notice: Subject to any disclaimer, the term of this patent is extended or adjusted under 35 U.S.C. 154(b) by 0 days.

(21) Appl. No.: 11/601,531

(22) Filed: Nov. 17, 2006

(65) Prior Publication Data
US 2008/0115401 A1    May 22, 2008

(51) Int. Cl.
*A01K 97/10*    (2006.01)
(52) U.S. Cl. .................... 43/21.2; 248/512; 248/530
(58) Field of Classification Search ............... 43/21.2; 248/511–513, 518–520, 530, 533
See application file for complete search history.

(56) References Cited

U.S. PATENT DOCUMENTS

| | | | | |
|---|---|---|---|---|
| 1,719,695 | A | 7/1929 | Ferguson | 248/515 |
| 2,196,472 | A | 4/1940 | Moriarty | 43/21.2 |
| 2,283,092 | A | 5/1942 | Rosen | 43/15 |
| 2,526,067 | A | 10/1950 | Curtess | 248/512 |
| 2,607,398 | A | 8/1952 | Andrews | 248/513 |
| D179,525 | S | 1/1957 | Porter | D31/4 |
| 2,854,147 | A | 9/1958 | Derr | 211/70.8 |
| 3,385,544 | A | 5/1968 | Barnett | 248/513 |
| D221,278 | S | 7/1971 | Wright | D22/22 |
| D222,672 | S | 11/1971 | Sather | D22/22 |
| D239,015 | S | 3/1976 | Stout | 22/13 |
| 4,003,612 | A * | 1/1977 | Munsell | 312/245 |
| 4,133,131 | A * | 1/1979 | Davy | 43/21.2 |
| 4,154,274 | A * | 5/1979 | Adamson | 206/315.2 |
| 4,176,819 | A * | 12/1979 | Lowe | 248/513 |
| 4,611,427 | A | 9/1986 | Coutcher | 43/21.2 |
| 4,650,146 | A | 3/1987 | Duke | 248/512 |
| 4,871,099 | A | 10/1989 | Bogar, Jr. | 224/42.45 |
| 5,058,308 | A | 10/1991 | Girard | 43/17 |
| 5,071,048 | A * | 12/1991 | Price et al. | 224/604 |
| 5,094,351 | A * | 3/1992 | Barney | 211/70.8 |

(Continued)

FOREIGN PATENT DOCUMENTS

FR    2576487    5/1987

(Continued)

OTHER PUBLICATIONS

"Pursuit Sports 8" Tree Style Triple Rod Holder http://www.fish307.com/procart/product_info.php?products_id=212, Retrieved from internet Aug. 23, 2006.

(Continued)

*Primary Examiner* — David J Parsley
(74) *Attorney, Agent, or Firm* — Ernest D. Buff; Ernest D. Buff & Associates LLC; Harry Anagnastopoulos

(57) ABSTRACT

A fishing rod carrier and holder device holds a plurality of fishing rods during fishing activity and houses the fishing rods when the device is being carried. The fishing rod carrier and holder device includes a support member having a spiked portion appointed for insertion into a ground surface. The support member includes a first horizontal plate having at least two rod holder apertures that define an aperture housing interrupted by an entry port. Additionally, the support member is provided with a second horizontal plate having at least two rod receiving cavities arranged in parallel longitudinal relation to the rod holder apertures of the first horizontal plate. The fishing rod carrier and holder device has at least one handle portion arranged to allow the fishing rod carrier and holder device to be carried with the fishing rods therein housed.

4 Claims, 6 Drawing Sheets

U.S. PATENT DOCUMENTS

| | | | | |
|---|---|---|---|---|
| 5,137,319 A | * | 8/1992 | Sauder | 294/159 |
| 5,383,299 A | | 1/1995 | Smelker | 43/21.2 |
| 5,487,475 A | * | 1/1996 | Knee | 211/70.8 |
| 5,533,295 A | | 7/1996 | Hochberger | 43/21.2 |
| 5,588,542 A | * | 12/1996 | Winkler et al. | 211/70.8 |
| 5,657,883 A | * | 8/1997 | Badia | 211/70.8 |
| 5,678,348 A | * | 10/1997 | Zielinski et al. | 43/26 |
| 5,715,952 A | | 2/1998 | Chichetti | 211/70.8 |
| 5,815,976 A | * | 10/1998 | Jernigan et al. | 43/21.2 |
| 5,987,803 A | | 11/1999 | White | 43/21.2 |
| 6,047,491 A | * | 4/2000 | De Busk | 43/21.2 |
| D426,282 S | * | 6/2000 | Harmon | D22/147 |
| 6,338,465 B1 | | 1/2002 | Stoner | 248/530 |
| 6,490,823 B1 | | 12/2002 | Ibarra | 43/21.2 |
| D507,817 S | | 7/2005 | Mitchell | 22/147 |
| 7,043,869 B1 | | 5/2006 | Hubbard | 43/21.2 |
| 2005/0102881 A1 | | 5/2005 | Legendziewicz | 43/21.2 |
| 2005/0126064 A1 | | 6/2005 | Winkler | 43/21.2 |
| 2005/0252071 A1 | | 11/2005 | Urban | 43/21.2 |

FOREIGN PATENT DOCUMENTS

| | | |
|---|---|---|
| GB | 2269518 | 2/1994 |
| JP | 05316915 | 12/1993 |

OTHER PUBLICATIONS

"Wildlife Six Slot Rod Holder" http://www.eangler.com/product/476981865.htm, Retrieved from internet Aug. 23, 2006.

* cited by examiner

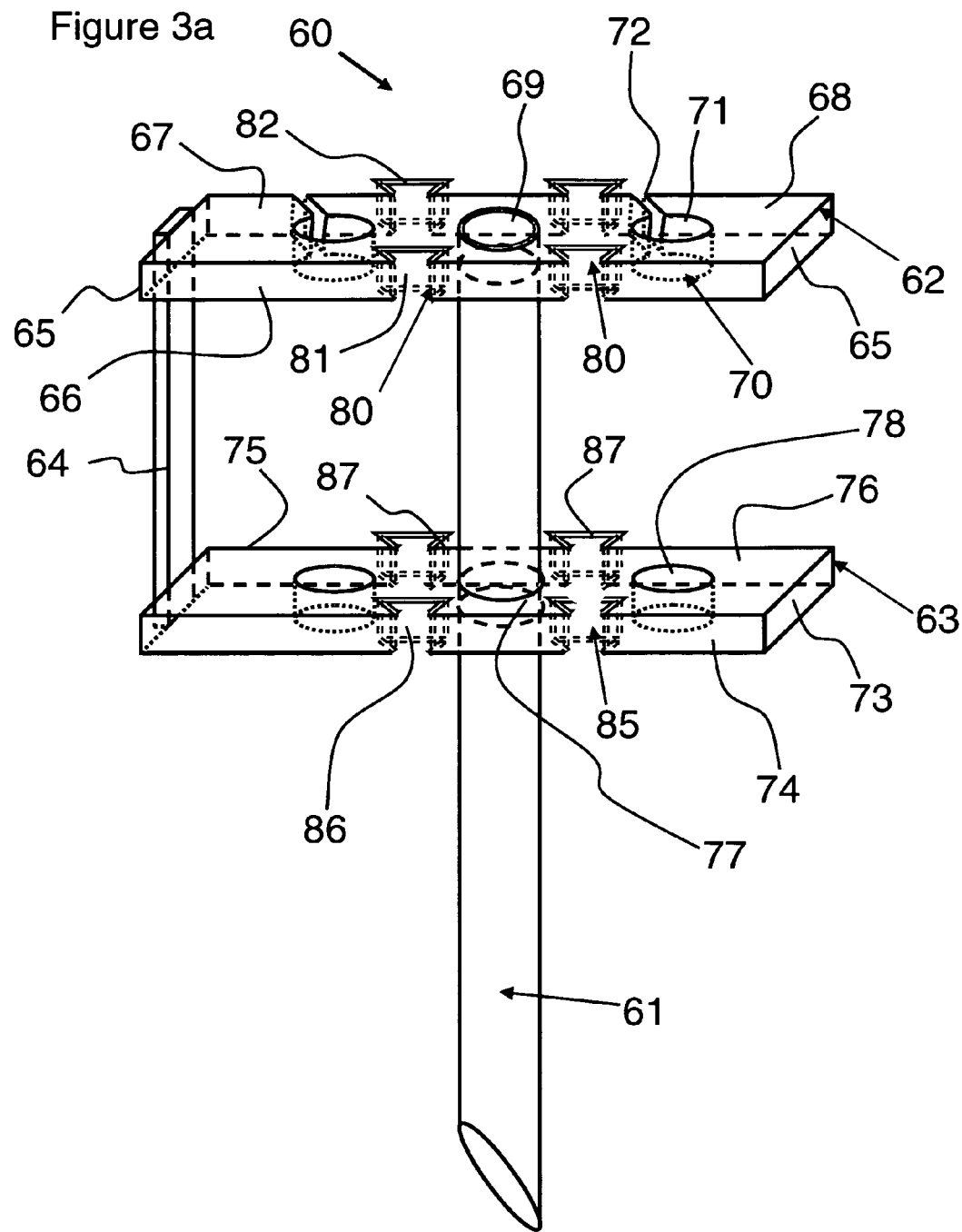

FISHING ROD CARRIER AND HOLDER DEVICE

BACKGROUND OF THE INVENTION

1. Field of the Invention

The present invention relates to a fishing rod carrier and holder device; and more particularly to a fishing rod carrier and holder device wherein a support member has a spike portion and first and second horizontal plates appointed to hold a plurality of fishing rods, and wherein the device is further constructed with a handle for transport of the device with the fishing rods therein housed.

2. Description of the Prior Art

When fishing, it has become customary to utilize a device holder appointed for holding a fishing rod during fishing activity, thereby enabling the fisherman to free his hands for other activities. Fishing rod holder devices frequently fail to provide the ability to hold more than one fishing rod, but merely provide single rod holding capabilities. Such is the case for conventional sand spike arrangements, wherein a cylindrical tube is appointed to receive a single fishing rod. Disadvantageously, these single fishing rod holding devices do not provide the ability to utilize a plurality of fishing rods simultaneously to increase the capacity for catching a greater number of fish.

Other devices do provide the ability to hold more than one fishing rod, but many of these devices provide tube-like holders that may not be able to retain and hold fishing rods having varying pole sizes or fishing rods wherein the base of the pole and real are in close association. Assorted devices provide for a holder having a plurality of deformations which portions of rods rest upon, however, these devices leave the rod vulnerable to disengagement from the holder when upward or lateral force is applied to the rod, such as when a large fish pulls on the rod. Further still, various devices provide a rack-like holding system for a plurality of rods, yet many of these devices are appointed to simply be utilized as a storage rack, and when such devices are appointed to be used during fishing, they generally do not provide for easy insertion of the rod as they generally include apertures in which the rods must be inserted. These aforementioned devices are discussed herein below. Moreover, none of the devices provide dual functionality, wherein the device acts both a carrying device during transport and a fishing rod support device during fishing activity.

Various fishing rod support or holder devices involve a main support, such as a spike or vertical portion appointed to be spiked into the ground or attached to a dock or boat, appointed with appendages having fishing rod holder devices thereto attached. These types of holders generally involve angulations or adjustments to the holders as the appendages typically include a pivoting function. Although the devices frequently provide for holding more than one rod, the devices cannot be practically utilized for transporting or carrying the rods when they are inserted into the holders. Also, placement of the rods into the device, after the device is secured to the ground, boat, dock, or other structure, involves setting the given desired angle for the rod (if angle adjustment is available).

For example, U.S. Pat. No. 1,719,695 to Ferguson discloses a fishing rod support utilizing a pipe having a series of collars adapted to anchor an outwardly projecting arm formed with u-shaped clips within which a fishing rod or pole is adapted to be supported. U.S. Pat. No. 4,650,146 to Duke discloses a surf fishing rod holder for angled support of at least one rod. The device includes an elongated tubular stand provided with support brackets and a pair of rod receptacles having a small tube-like construction, and being pivotally connected to the support bracket. U.S. Pat. No. 6,490,823 to Ibarra discloses a fishing rod holding apparatus which is capable of holding a fishing pole, an umbrella, and a lantern, wherein the apparatus generally includes a vertical support with tube-like holders extending therefrom, and constructed so that the fishing rod may be swung about. U.S. Design Pat. No. D222,672 to Sather discloses an ornamental design for a combination trailer hitch support and fishing pole holder having a vertical main spike portion and two tube-like structures appointed for receiving fishing poles pivotally extending tangentially therefrom. U.S. Design Pat. No. D239,015 to Stout discloses an ornamental design for a fishing stand having a vertical main spike portion with two tube-like holders appointed for receiving fishing poles therein, tangentially extending at an angle from the vertical main spike portion and being approximately 180° from one another. Foreign Patent No. JP 5,316,915 to Furuya discloses a folding y-type fishing rod stand generally including a central vertical spike with a left and right arm, and further including an angle adjusting part having an angle adjusting hole so that the direction of a fishing rod can be adjusted.

In addition, some fishing rod holders provide a main vertical support adapted to be attached to a structure or inserted into the ground. The vertical support is provided with both angled appendages to which fishing rod holder devices are attached. It is also provided with vertically standing tube-like holders for holding a fishing rod in a substantially vertical, non-angled position. Although the devices provide for holding more than one rod, the devices cannot be practically utilized for transporting or carrying the rods when they are inserted into the holders. Also, these devices are typically appointed for attachment to a dock or boat. See for example U.S. Published Patent App. No. 2005/0102881 to Legendziewicz which discloses a fishing rod holder assembly including two or more fishing rod holders and a fishing rod holder support stanchion member having an anchoring post and a u-shaped horizontal crossbar member connected thereto a first upwardly extending holding post and a second upwardly extending holding post and wherein attachment elements may be mounted on the first and second upwardly extending holding posts for forming a fishing rod holder assembly.

Assorted fishing rod holder devices provide a main vertical support with tube-like holders extending therefrom, typically in an angled orientation from the horizontal plane. Many of these holder devices are appointed to be placed on land, or on the bottom of a body of water. Although these devices typically provide for holding more than one fishing rod, they utilize tube-like holders which can cause insertion problems for some fishing rods, particularly where the base and real are in close association. In addition, these devices cannot be utilized for transporting or carrying the rods.

See, for example: U.S. Pat. No. 2,196,472 to Moriarty discloses a fishing apparatus wherein a vertical member is provided and is adapted to be secured into the ground on the bottom of a body of water, in addition, the vertical member is appointed to receive a member having one or more sockets or short tubes to serve as sockets for holding a pole or fishing rod; U.S. Pat. No. 5,058,308 to Girard discloses a fish alarm apparatus including at least one fishing pole support socket attached to a support bar for securing a fishing pole. The fishing line is directed through a bifurcated mount appointed to release the fishing line therefrom upon a fish strike, and further appointed to actuate an alarm upon a fish strike; U.S. Pat. No. 5,383,299 to Smelker discloses a vertical post insertable into the ground appointed with a pair of tubes that are rotationally displaced at an acute angle whereby the fishing rods extend at a proper angular orientation with respect to each other and the horizontal; U.S. Pat. No. 5,987,803 to White discloses a rod holder having a platform with upper and lower planar surfaces including tube-like first and second rod receiving members pivotally connected to the upper surface of the platform; U.S. Published Patent App. No. 2005/0252071 to Urban discloses a fishing rod holder bucket having a pair of rod holders slanted in opposing directions affixed therein, whereby the bucket is positioned during use and the rods are displaced such that the distance between the fishing rod tips is maximized to decrease the likelihood of rod tip interference and line entanglement; U.S. Design Pat. No. D179,525 to Porter discloses an ornamental design for a fishing pole holder having a base with an appendage connected thereto, and a horizontal cross-bar appointed with dual tube-like holders for receiving the bases of fishing poles; and U.S. Design Pat. No. D507,817 to Mitchell discloses an ornamental design including a main vertical tube-spike with a hollow inside and two L-shaped fishing rod tube-arm holders arranged at an angle from the horizontal plane.

Variations of the main vertical support with tube-like holders extending therefrom are disclosed wherein a seat or chair to accommodate the fisherman is further provided. These devices inherently involve the disadvantages of the tube-like holders because they likely fail to provide adequate holding for a variety of sized fishing rods. Moreover, these devices do not provide fishing rod transport capability. For example, see the following: U.S. Pat. No. 2,607,398 to Andrews discloses a combined stool and fishing rod support wherein a seat is provided on top of a tubular standard, and wherein the tubular standard is appointed with upwardly and outwardly diverging fishing rod receiving sockets comprising sections of tubing. U.S. Published Patent App. No. 2005/0126064 to Winkler discloses a fishing chair and fishing apparatus that mounts directly in the sandy bottom of a shallow surf including a seat assembly mounted at the upper end of a base pole for supporting a fisherman, appointed with adjustable fishing pole holders via a tube-like structure, a tackle box, a bait box, a bait cutting surface, a fish net holder, and a fish stringer and basket.

Other devices generally disclose a vertical support assembly, involving more than one leg, wherein the vertical supports are connected to tube-like fishing rod holders, typically in an angled orientation from the horizontal plane. These devices typically provide for accommodating more than one fishing rod, however, they utilize tube-like holders which can cause insertion problems for some fishing rods, particularly where the base and real are in close association. In addition, these devices cannot be utilized for transporting or carrying the rods, even if the devices provide for transport of the device themselves, rods cannot be carried via the devices. See, for example: U.S. Pat. No. 2,283,092 to Rosen discloses a fishing outfit wherein an arm extends from a standard and is adapted to attach to a fishing line and further appointed to be attached to a tri-pod device; U.S. Pat. No. 5,533,295 to Hochberger discloses a device for holding at least one fishing pole in a generally upright position wherein the holder includes an inner leg and a pair of outer legs having a lower portion adapted to engage a surface and an upper portion constructed and arranged for holding a fishing pole, additionally, a combination fishing pole holder and angler pack is disclosed and includes a shoulder harness for releasably attaching the holder around the shoulders when the rods are not held therein; and U.S. Design Pat. No. D221,278 to Wright discloses an ornamental design for a fishing pole anchor having two u-shaped base leg portions, one being taller and wider than the other, appointed with three tube-shaped holders each appointed for receiving the base of a fishing pole, angled from one another on the horizontal plane and vertical plane.

Even where devices provide for a holding system wherein varying sized rods can be held in place during fishing without insertion problems due to rod and real association, many of these devices may not provide adequate support and holding when force is applied to the line of the rod (i.e. such as when a fish has been caught). Unlike the tube-type holders, these holding devices generally include u or v-shaped deformities which receive a portion of the fishing rod. Upward force applied to the rods would likely cause the rods to be disengaged from the deformity, and cause the rod to fall to the ground. In addition, these devices cannot be utilized for transporting or carrying the rods, even if the devices provide for transport of the device themselves, rods cannot be carried via the devices.

For example, U.S. Pat. No. 2,526,067 to Curtess discloses a fishing pole holder having a horizontal front member appointed with a plurality of spaced deformities for nesting a portion of a plurality of fishing poles thereabove, two laterally and a rear swing-able leg adapted to be thrust into the ground, and a rear horizontal element having a downward facing portion for nesting the butt ends of the plurality of poles therebelow. U.S. Pat. No. 3,385,544 to Barnett discloses a dual rod and real holder including a vertical shaft member engaged with a central body portion of a cross bar assembly having a pair of arms each terminating in a finger having a v-shaped deformation each appointed to receive a portion of a fishing rod while the lower ends of the rods are supported by a lower crosspiece. U.S. Pat. No. 4,611,427 to Coutcher discloses a collapsible fishing rod holder including a ground engaging leg and two pivotally connected arms with fishing rod support finger deformations. U.S. Pat. No. 6,338,465 to Stoner discloses a fishing rod holder having a frame with an anteriorly disposed side having a plurality of anterior fishing rod accommodations and a posteriorly disposed side having plurality of corresponding inverted posterior fishing rod accommodations, wherein each anterior and posterior accommodation acts in concert to removably hold a fishing rod there-above and there-under, respectively. U.S. Pat. No. 7,043,869 to Hubbard discloses a modular portable multi rod fishing stand for retaining a plurality fishing rods having a weighted base member including a pole extending vertically therefrom, and a first and second bar each having at least one rod holder removably connected thereto wherein the rod holders include a U-shaped member and a curvilinear member for receiving a fishing rod pole. Foreign Patent No. FR 2,576,487 to Lhuillier discloses a device appointed to support at least one fishing rod in the use position, generally including a pair of inverted u-shaped legs having a pair of horizontal bars thereupon, wherein one of the horizontal bars has apertures for receiving the back ends of fishing rods with the other horizontal bar having corresponding u-shaped holders for receiving the front end of the fishing rods. Foreign Patent No. GB 2,269,518 to Patridge discloses a fishing rod support including a vertical spiked mount having telescopic struts attached to a horizontal fishing rod support to form a t-shaped device, the horizontal fishing rod support is further appointed with a pair of V-shaped rod support brackets for receiving a portion of a fishing rod.

Still other fishing pole holding devices generally provide a vertical rod appointed with horizontal plates, wherein the plates are further appointed with a bore or aperture for holding a fishing rod between the horizontal plates. Many of these devices are actually fishing pole racks that are not appointed to be utilized during fishing, but are merely appointed to be utilized for storage of a plurality of fishing rods. For example, see the following: U.S. Pat. No. 2,854,147 to Derr discloses a fishing pole rack having a vertical elongated rod member appointed with a lower base support having depressions therein for supporting the bottoms of rods, and an upper support element with a plurality of similarly arranged holes for receiving and housing the upper ends of the poles; U.S. Pat. No. 4,871,099 to Bogar discloses a fishing rod holder having a plurality of vertically extending tubular rod holders connected to a plurality of horizontally spaced supports in which the top of each rod holder includes a first and second downwardly and inwardly tapered slot for receiving and holding a fishing reel, wherein the apparatus may further be appointed to hold a knife and fish pliers; and U.S. Pat. No. 5,715,952 to Chichetti discloses a portable fishing rod holding device adapted to be removably attached to any smooth non-porous surface by way of a plurality of suction cups, and having a pair of parallel horizontal supporting members with a plurality of vertically spaced and hollow tubular fishing rod holders therein (may be utilized during fishing, but not practical unless secured to a non-porous surface, such as a portion of a boat).

Various fishing pole holding devices that are appointed to be utilized while fishing provide a vertical rod appointed with horizontal plates having a bore or aperture for holding a fishing rod there-between. These devices typically do not provide for an interrupted aperture appointed with access entry, but provide a hole or aperture wherein the bottom of a fishing rod is inserted. Additionally, these devices tend to place the horizontal plate in close proximity to one another, so that the distance between the plates, and visa vie, the holding points on the fishing rod, are close in space. As a result, the fishing rod may easily become freed from the holder if force is applied to the line and the fishing rod, such as when a large or powerful fish has interacted with the fishing line. Moreover, these devices cannot be utilized for transporting or carrying the rods as no handle is provided, and the distance between the plates would not provide for adequate support if the device was to be carried on the horizontal plane as the rods would disengage from the holder and fall to the ground. For example, see U.S. Pat. No. 4,176,819 to Lowe discloses a portable fishing rod holder for one or more fishing rods that generally comprises two or more rectangular plates fixed in vertically spaced parallel relation by means of an elongated shaft, wherein the upper plate is provided with a pair of bores for a poles shaft, while the lowermost plate is provided with a pair of bores arranged closer to the shaft for holding the lower portion of the rod in an angled configuration.

Notwithstanding the efforts of prior art workers to construct an efficient fishing rod holder device appointed for supporting a plurality of fishing rods during fishing activity, there remains a need in the art for a fishing rod carrier and holder device having a construction that readily facilitates insertion of a spiked portion into the ground. In addition, there is a need in the art for a fishing rod carrier and holder device adapted to hold a plurality of rods having varying sizes in a secure manner so that risk of the rods becoming disengaged form the holder is mitigated. There is yet a further need in the art to provide a fishing rod carrier and holder device wherein the portion for holding the fishing rod is equipped with an accessible entry port so that the rod can readily be inserted into the holder via horizontal entry. Moreover, there is a need in the art for a fishing rod carrier and holder device that provides a handy carrying device especially suited for transporting and carrying the fishing rods to the fishing destination.

SUMMARY OF THE INVENTION

The present invention yields an efficient fishing rod carrier and holder device that supports a plurality of fishing rods during fishing activity, and has a construction that permits reception of a plurality of fishing rods while facilitating insertion of a spiked portion into the ground The fishing rod carrier and holder device is adapted to hold a plurality of rods having varying sizes in a secure manner, so that risk of the rods becoming disengaged from the holder is mitigated. Moreover, the fishing rod carrier and holder device provides for optimal securing of the fishing rod in the device while at the same time providing an accessible entry port, so that the rod can readily be inserted into the holder via horizontal entry. In addition, the fishing rod carrier and holder device provides a handy carrying device especially suited for transporting and carrying the fishing rods to the fishing destination.

The fishing rod carrier and holder device includes a support member having a top end, mid section, and a bottom end. The bottom end further comprises a spike portion appointed to be inserted into a ground surface when the fishing rod carrier and holder device is being utilized during a fishing activity. The fishing rod carrier and holder device further includes a first horizontal plate comprising plate sidewalls, a plate front, a plate rear, and a plate portion. The plate portion further comprises a first support aperture and at least two rod holder apertures. The rod holder apertures each further include an aperture housing interrupted by an entry port.

Additionally, the fishing rod carrier and holder device comprises a second horizontal plate having lateral walls, a front wall, a back wall, and a plate surface. The plate surface further comprises a second support aperture and at least two rod receiving cavities arranged in parallel longitudinal relation to the rod holder apertures of the first horizontal plate. Furthermore, the fishing rod carrier and holder device comprises at least one handle portion arranged to allow the fishing rod carrier and holder device to be carried with the fishing rods therein housed.

BRIEF DESCRIPTION OF THE DRAWINGS

The invention will be more fully understood and further advantages will become apparent when reference is had to the following detailed description of the preferred embodiments of the invention and the accompanying drawings, in which:

FIGS. 3a, 3b, 3c and 3d illustrate an embodiment of the fishing rod carrier and holder device wherein connection means are provided so that at least two first horizontal plates and second horizontal plates can be jointed together.

DETAILED DESCRIPTION OF THE INVENTION

The present invention provides a fishing rod carrier and holder device that supports a plurality of fishing rods during fishing activity as well as during transport. The fishing rod carrier and holder device is readily usable by inserting a spiked portion thereof into a ground surface. Advantageously, the fishing rod carrier and holder device is appointed to accommodate a plurality of fishing rods having various sizes.

The fishing rod carrier and holder device secures the fishing rod thereto at a first portion and a second portion, so that the rod is securely housed within the device to sustain the rigors of fishing activity as well as carrying and transport. Advantageously, the fishing rod carrier and holder device is further appointed to be capable of carrying the fishing rods within the device when the fisherman is walking or transporting the fishing rods and fishing rod carrier and holder device.

Figure 1:
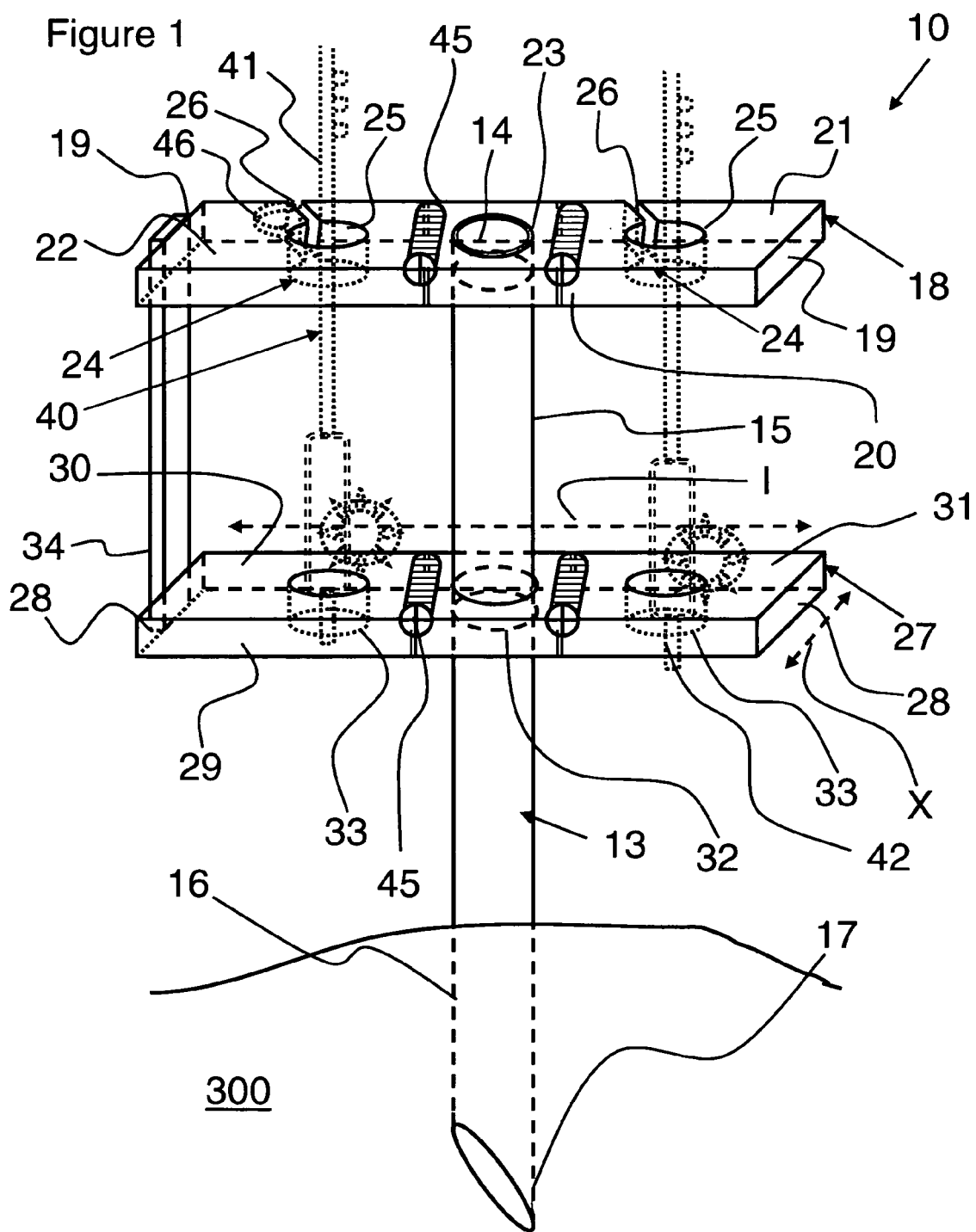
FIG. 1 is a schematic view illustrating an embodiment of the fishing rod carrier and holder device inserted into a ground surface during a fishing activity.

FIG. 1 illustrates generally at 10 a schematic view of an embodiment of the fishing rod carrier and holder device. Fishing rod carrier and holder device 10 comprises a support member 13 having a top end 14, mid section 15, and a bottom end 16. Bottom end 16 has a spike portion 17 appointed to be inserted into a ground surface 300 when the fishing rod carrier and holder device 10 is being utilized during a fishing activity. A first horizontal plate 18 comprising plate sidewalls 19, a plate front 20, a plate rear 21, and a plate portion 22 is attached to support member 13. Attachment to support member 13 may be temporary, so that first horizontal plate 18 can be disassembled from support member 13. Alternatively, first horizontal plate 18 may be fixedly attached to support member 13. Plate portion 22 of first horizontal plate 18 includes a first support aperture 23 and at least two rod holder apertures 24. First support aperture 23 is appointed to receive top end 14 of support member 13. Rod holder apertures 24 each further include an aperture housing 25 interrupted by an entry port 26. These rod holder apertures 24 of first horizontal plate 18 are each appointed to receive a first portion 41 of a fishing rod 40.

In operation, first portion 41 of fishing rod 40 is inserted into entry port 26 on a substantially horizontal plane, and first portion 41 traverses into aperture housing 25 of rod holder aperture 24. Entry port 26 of rod holder aperture 24 of first horizontal plate 18 preferably extends into aperture housing 25 from either plate front 20 or plate rear 21 of first horizontal plate 18. Entry port 26 preferably comprises at least one angled wall portion 46 substantially extending from either plate front 20 or plate rear 21 into aperture housing 25 (herein entry port 26 is shown extending from plate rear 21 into aperture housing 25). The angled nature of entry port 26 provides enhanced securing of first portion 41 of fishing rod 40 in aperture housing 25 by mitigating the risk of fishing rod 40 escaping aperture housing 25.

Fishing rod carrier and holder device 10 further includes a second horizontal plate 27 having lateral walls 28, a front wall 29, a back wall 30, and a plate surface 31. Plate surface 31 includes a second support aperture 32 and at least two rod receiving cavities 33 arranged in parallel longitudinal relation to rod holder apertures 24 of first horizontal plate 18. Rod receiving cavities 33 of second horizontal plate 27 are each appointed to receive a second portion 42 of fishing rod 40 when first portion 41 of fishing rod 40 is inserted into rod holder aperture 24 of first horizontal plate 18 so that fishing rod 40 is housed within fishing rod carrier and holder device 10. At least one handle portion 34 is included by the device 10. Support member 13, first horizontal plate 18, second horizontal plate 27, and handle 34 are separable from one another so that fishing rod carrier and holder device 10 can readily be disassembled for convenient storage. Optionally, first horizontal plate 18 and said second horizontal plate 27 include hinge portions 45 so that horizontal plates 18 and 27 can be folded against support member 13 to form a foldable or collapsible fishing rod carrier and holder device.

Through utilizing the holders 24 and cavities 33 of first and second horizontal plates 18 and 27, respectively, fishing rod 40 is secured within the device 10 by way of a dual support system so that the rod 40 is securely held therein during a fishing activity, and when being carried. Although fishing rod carrier and holder device 10 is shown as having two rod holder apertures 24 in first horizontal plate 18 and two rod receiving cavities 33 in second horizontal plate 27 so that first and second horizontal plates 18 and 27 of fishing rod carrier and holder device 10 are appointed to hold two fishing rods 40 therein, horizontal plates 18 and 27 can be appointed to accommodate a plurality of fishing rods 40 therein. In such case, horizontal plates 18 and 27 may have a wider width, shown as I, to accommodate a greater number of rod holder apertures 24 and rod receiving cavities 33 so that more fishing rods 40 can be held by the horizontal plates 18 and 27. Optionally, horizontal plates 18 and 27 may have a greater depth, shown as X, to accommodate a greater number of rod holder apertures 24 and rod receiving cavities 33 so that more fishing rods 40 can be held by the horizontal plates 18 and 27. Preferably, first horizontal plate 18 comprises two to ten rod holder apertures 24 and second horizontal plate 27 comprises two to ten rod receiving cavities 33 so that first and second horizontal plates, 18 and 27, of fishing rod carrier and holder device 10 are appointed to hold two to ten fishing rods. More preferably, first horizontal plate 18 comprises two to six rod holder apertures 24 and second horizontal plate 27 comprises two to six rod receiving cavities 33 so that first and second horizontal plates, 18 and 27, of fishing rod carrier and holder device 10 are appointed to hold two to six fishing rods.

Figure 2:
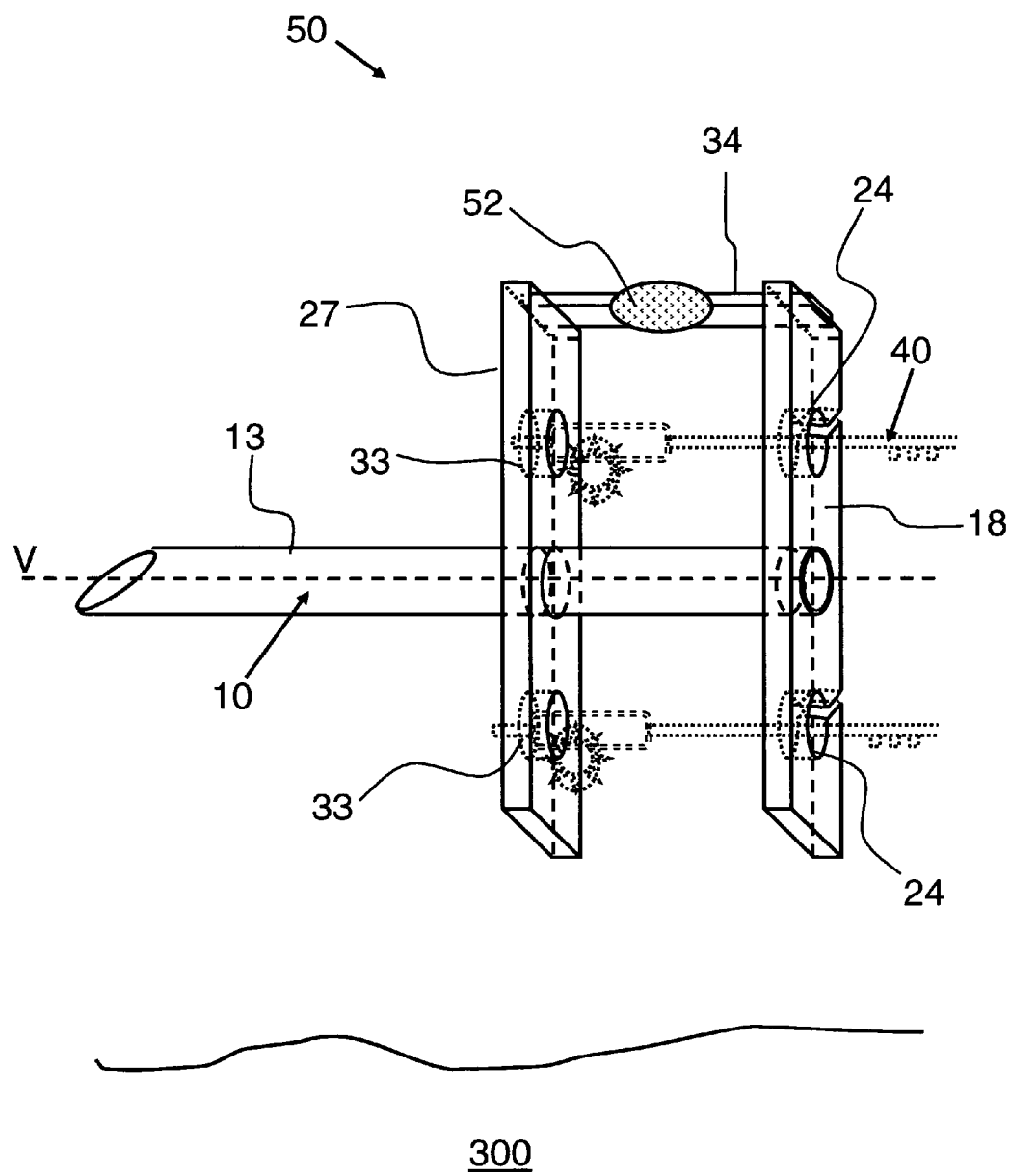
FIG. 2 is a schematic view illustrating the fishing rod carrier and holder embodiment of FIG. 1, being carried with fishing rods housed therein.

FIG. 2 illustrates generally at 50 a schematic view of the embodiment of FIG. 1 of the fishing rod carrier and holder device 10 being carried with fishing rods 40 housed therein. Handle portion 34 is arranged to allow fishing rod carrier and holder device 10 to be carried on the horizontal plane with fishing rods 40 therein housed. In operation, fishing rod carrier and holder device 10 with fishing rods 40 therein housed via first and second horizontal plates 18 and 27, is rotated to the horizontal plane and handle portion 34 is gripped by an individual. Preferably, handle portion 34 extends between first and second horizontal plates, 18 and 27, respectively, so that fishing rod carrier and holder device 10 is carried in a horizontal orientation indicated by V. Optionally, handle portion 34 further comprises a handle grip surface 52 to provide optimal carrying without grasp slippage, as can result without grip surface 52, especially if handle 34 has become wet. Grip surface 52 is composed of a frictional material. Preferably, grip surface 52 is composed of a water absorbent or porous material, such as cork or foam, to further prevent slippage while carrying, while at the same time providing comfort to the individual.

Figure 3B:
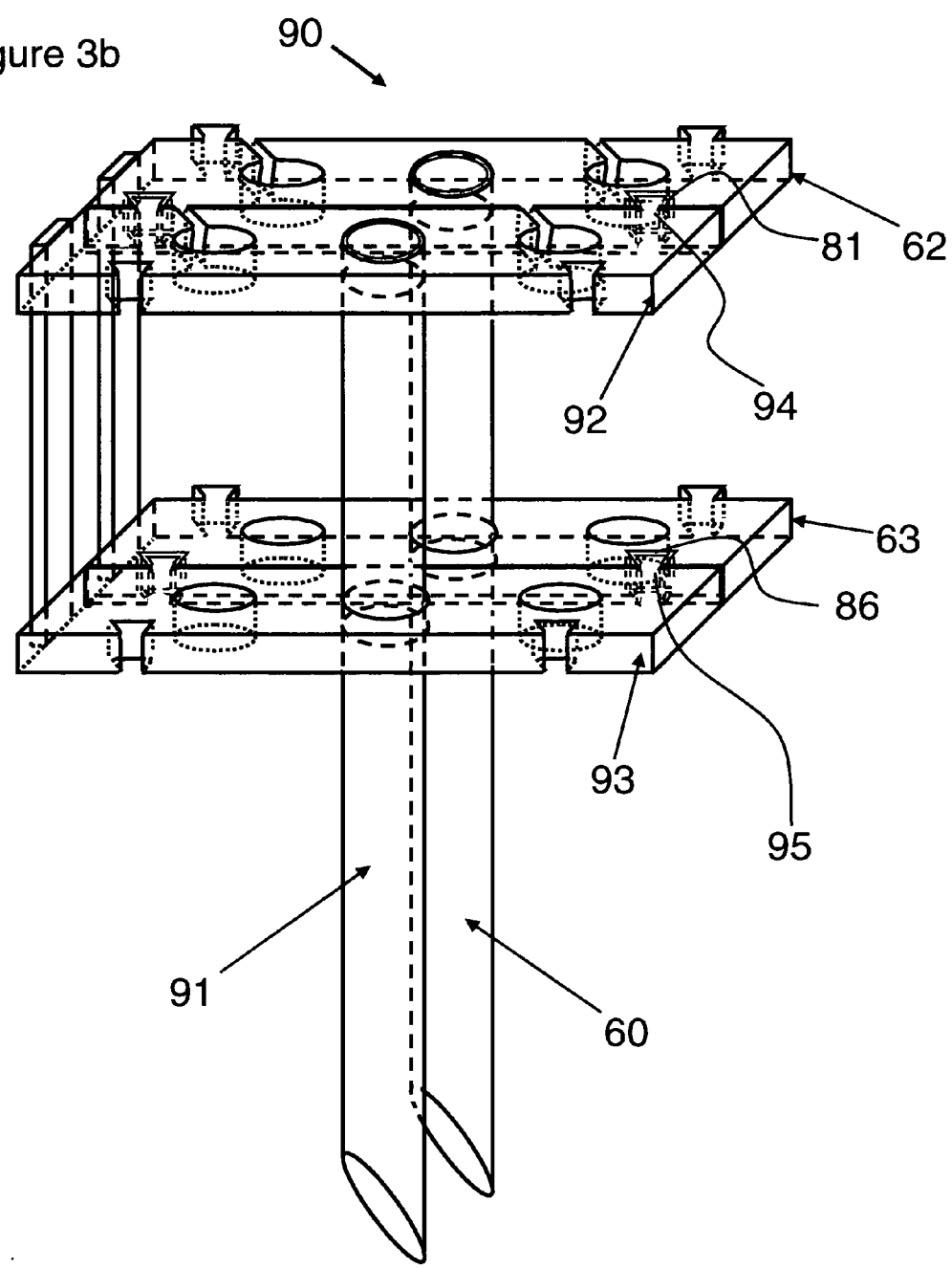
Figure 3C:
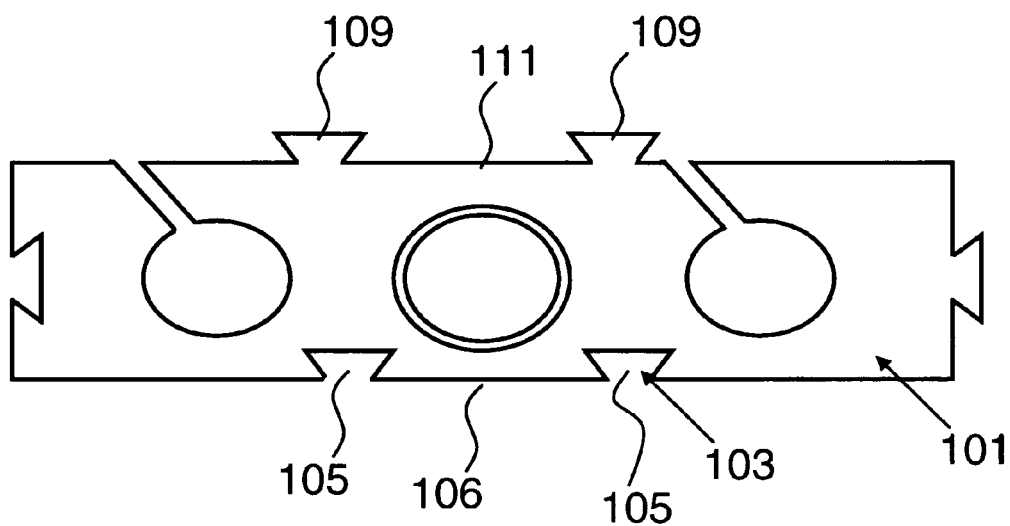
Figure 3D:
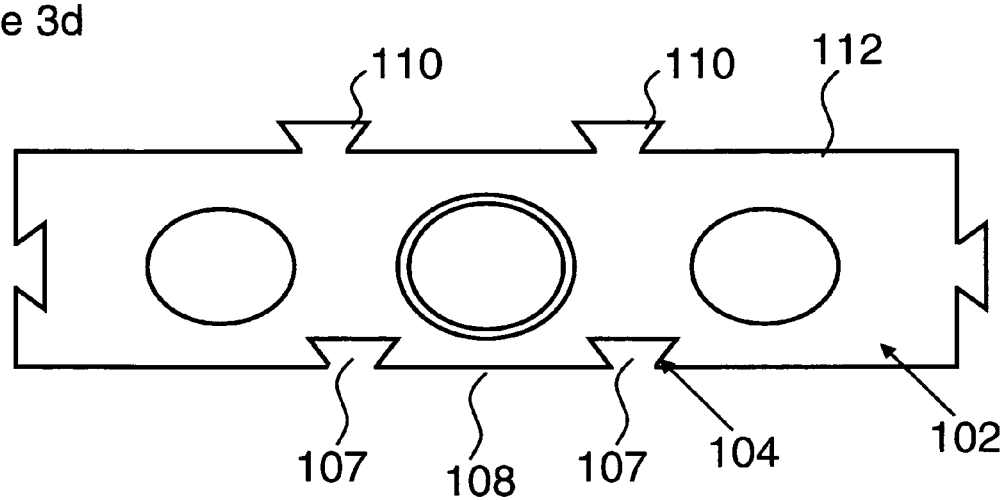

FIGS. 3*a*, 3*b*, 3*c* and 3*d* illustrate an embodiment of the fishing rod carrier and holder device wherein connection means are provided so that at least two first horizontal plates and second horizontal plates can be jointed together. That is to say, additional, independent horizontal plates may be provided with connection means so that additional plates can be added to a pre-existing fishing rod carrier and holder device so that there is only a single support member. Alternatively, horizontal plates of an existing device may be provided with connection means so that the device can be added to another fishing rod carrier and holder device so that more than one fishing rod carrier and holder device is connected together, and visa vie there are more than one support member. Specifically, FIG. 3*a* illustrates a fishing rod carrier and holder device wherein the horizontal plates are provided with connection means so that either additional horizontal plates can be added to the device, or so that an additional device can be joined to the device, shown generally at 60; FIG. 3*b* illustrates the joining of two fishing rod carrier and holder devices by way of connection means located on the horizontal plates, shown generally at 90; and FIGS. 3c and 3d illustrate additional horizontal plates (with FIG. 3c showing an additional first horizontal plate and FIG. 3d showing an additional second horizontal plate) that are appointed to be added to a fishing rod carrier and holder device.

FIG. 3a illustrates a fishing rod carrier and holder device 60 having a support member 61, first horizontal plate 62, second horizontal plate 63 and handle 64 connected together to form device 60. First horizontal plate 62 includes plate sidewalls 65, a plate front 66, a plate rear 67, and a plate portion 68 attached to support member 61. Plate portion 68 of first horizontal plate 62 includes a first support aperture 69 for receiving support portion 61 and at least two rod holder apertures 70 including an aperture housing 71 interrupted by an entry port 72 for housing a first portion of a fishing rod. Entry port 72 of rod holder aperture 70 of first horizontal plate 62 preferably extends into aperture housing 71 from either plate front 66 or plate rear 67 of first horizontal plate 62. First horizontal plate 62 of fishing rod carrier and holder device 60 further includes first connection means 80 so that additional first horizontal plates can be added to fishing rod carrier and holder device 60. Alternatively, first horizontal plate 62 of fishing rod carrier and holder device 60 further includes connection means 80 so that additional fishing rod carrier and holder devices can be added to fishing rod carrier and holder device 60 (as is shown in FIG. 3b).

Continuing with FIG. 3a, fishing rod carrier and holder device 60 further includes a second horizontal plate 63 having lateral walls 73, a front wall 74, a back wall 75, and a plate surface 76. Plate surface 76 includes a second support aperture 77 and at least two rod receiving cavities 78 arranged in parallel longitudinal relation to rod holder apertures 70 of first horizontal plate 62. Rod receiving cavities 78 of second horizontal plate 63 are each appointed to receive a second portion of a fishing rod when the first portion of the fishing rod is inserted into rod holder aperture 70 of first horizontal plate 62 so that the fishing rod is housed within fishing rod carrier and holder device 60. Second horizontal plate 63 further includes connection means 85 so that additional second horizontal plates can be added to fishing rod carrier and holder device 60. Alternatively, horizontal plate 63 further includes second connection means 85 so that additional fishing rod carrier and holder devices can be added to fishing rod carrier and holder device 60 (as is shown in FIG. 3b).

First connection means 80 comprises at least one first female connector 81 located on plate front 66 of first horizontal plate 62. Second connection means 85 comprises as least one second female connector 86 located on front wall 74 of second horizontal plate 63. Correspondingly, first connection means 80 further comprises at least one first male connector 82 located on plate rear 67 of first horizontal plate 62 and second connection means 85 further comprises at least one second male connector 87 located on back wall 75 of second horizontal plate 63. In operation, female connectors 81 and 86 of first and second horizontal plates 62 and 63, respectively, receive a male connector (having the construction of first and second male connectors 82 and 87) of another first and second horizontal plate so that a plurality of first and second horizontal plates can be added to fishing rod carrier and holder 60. Alternatively, in operation, female connectors 81 and 86 of first and second horizontal plates 62 and 63, respectively, receive a male connector (having the construction of first and second male connectors 82 and 87) of another first and second horizontal plate so that a plurality of fishing rod carrier and holder devices can be joined together, as is shown in FIG. 3b at 90.

FIG. 3b illustrates the joining of two fishing rod carrier and holder devices by way of connection means located on the horizontal plates, shown generally at 90. In this embodiment, the fishing rod carrier and holder device 60 of FIG. 3a is shown joined with another fishing rod carrier and holder device 91. Female connectors 81 and 86 of first and second horizontal plates 62 and 63, respectively, of fishing rod carrier and holder device 60 have received a male connector 94 and 95 of first and second horizontal plates 92 and 93, respectively of fishing rod carrier and holder device 91 so that fishing rod carrier and holder devices 60 and 91 are joined together.

FIGS. 3c and 3d illustrate top planer views of additional horizontal plates appointed to be added to a fishing rod carrier and holder device. Specifically, FIG. 3c shows an additional first horizontal plate and FIG. 3d shows an additional second horizontal plate. First horizontal plate 101 and second horizontal plate 102 include first and second connection means 103 and 104, respectively, so that horizontal plates 101 and 102 can be joined to horizontal plates of a fishing rod carrier and holder device. First connection means 103 comprises at least one first female connector 105 located on a plate front 106 of first horizontal plate 101. Second connection means 104 comprises at least one second female connector 107 and front wall 108 of second horizontal plate 102. First connection means 103 and second connection means 104 each further comprise at least one first and second male connector, 109 and 110, respectively, located on plate rear 111 of first horizontal plate 101 and back wall 112 of second horizontal plate 102. First and second female connectors 105 and 107 of first and second horizontal plates 101 and 102, respectively, are appointed to receive first and second male connectors and of another first and second horizontal plate, respectively, of a fishing rod carrier and holder device so that plates 101 and 102 can be added to the fishing rod carrier and holder device.

Figure 4:
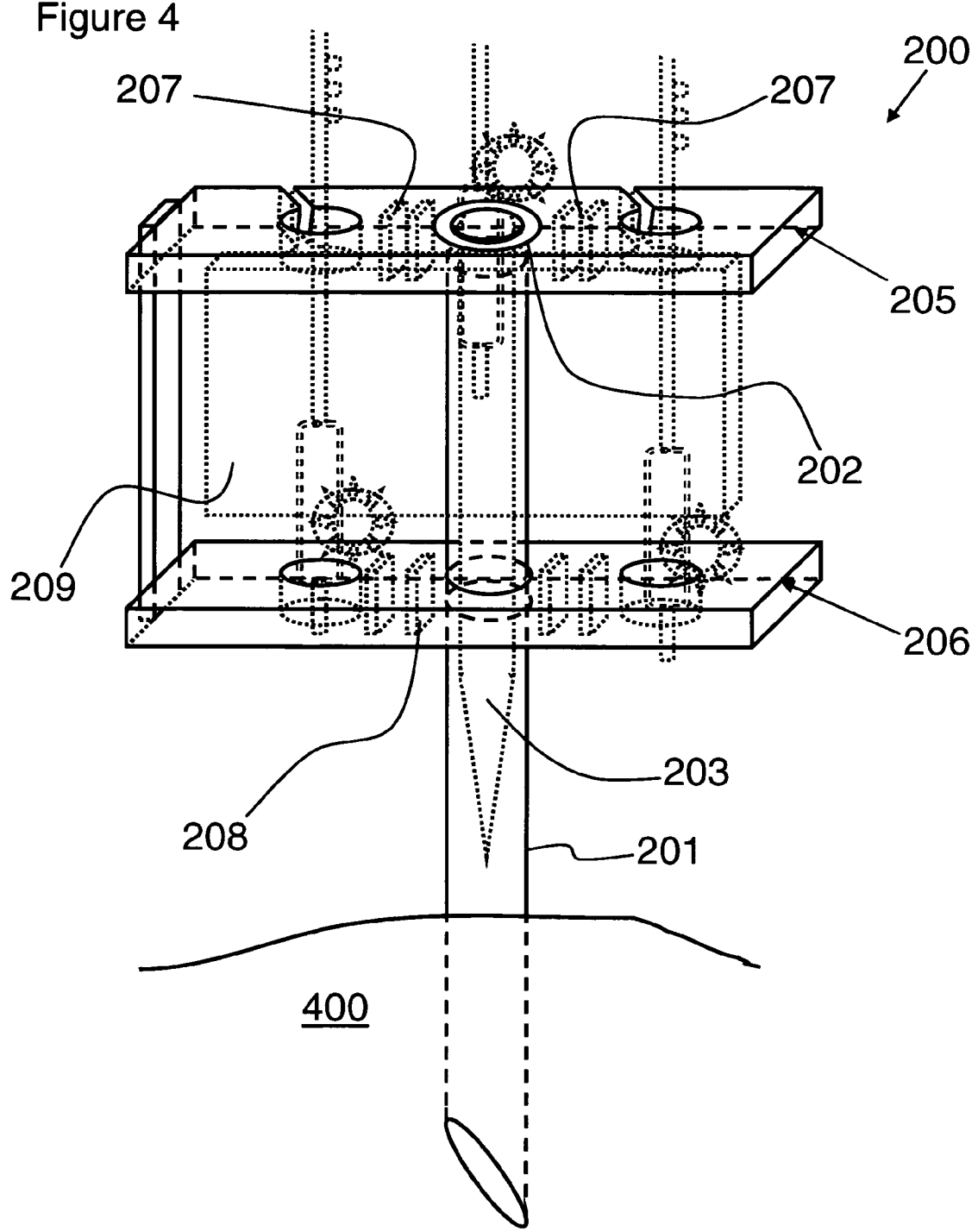
FIG. 4 illustrates another embodiment of the fishing rod carrier and holder device.

FIG. 4 illustrates another embodiment of the fishing rod carrier and holder device, shown generally at 200. Fishing rod carrier and holder device 200 includes support member 201 having a hollow body. The hollow body of support member 201 may be used to receive and hold another fishing rod therein. The hollow body of support member 201 may further comprise a sand spike housing 202 wherein at least one sand spike 203 is housed therein. Sand spike 203 is appointed to be spiked into a ground surface 400 and is adapted to receive and hold another fishing rod therein. Fishing rod carrier and holder device 200 includes a first horizontal plate 205 and a second horizontal plate 206 each further comprising a plurality of longitudinally parallel slots and/or holes 207 and 208, respectively, appointed to be utilized to store fishing tools. These tools may include knives, blades, pliers, or other tools utilized during fishing. Fishing rod carrier and holder device 200 further includes a removable cutting board 209 attached to first horizontal plate 205 by way of attachment means, such as clips or the like. Cutting board 209 may be attached to second horizontal plate 206 by way of attachment means.

The fishing rod carrier and holder device may include protective inserts within the rod holder apertures of the first horizontal plate and the rod receiving cavities of the second horizontal plate to protect the fishing rod and mitigate damage thereto. At the same time, the protective inserts act to provide enhanced securing of the rod in the device and mitigate slippage. The protective insert may be selected from the group consisting of rubber, foam, cork, silicone, or a polymeric material. In addition, the rod holder apertures of the first horizontal plate and the rod receiving cavities of the second horizontal plate may further comprise a securing means to yield a highly secure environment for housing the fishing rod during fishing and carrying. The securing means may comprise a strap or clip that loops around the fishing rod from the apertures or cavities of the horizontal plates. The fishing rod carrier and holder device may further include a tackle container adapted for housing tackle and other fishing gear. This tackle container may comprise a tackle bag appointed to be received within the support member when the support member is hollow. In addition, the fishing rod carrier and holder device may further comprise a removable flash light. Moreover, the fishing rod carrier and holder device may include snaps or clips located on the first and second horizontal plates for accommodating a strap appointed for carrying the fishing rod carrier and holder device on the shoulder or the like.

Although the fishing rod carrier and holder device is generally shown holding two fishing rods, the device can hold anywhere from two to ten fishing rods, preferably holding between two to six fishing rods. The fishing rod carrier and holder device may be composed of plastic, wood, fiberglass, carbon fiber, foam, aluminum, steel, stainless steel, or rubber. Assembly options of the fishing rod carrier and holder device include snapped, clipped, screwed, glued, welded, bonded or one piece assembly (via injection molding). The fishing rod carrier and holder device may have dimensions ranging from the following: height of one to four feet; width of three to twelve inches; and length of twelve to thirty-six inches. The fishing rod carrier and holder device may further include an integrated cup/bottle carrier.

Having thus described the invention in rather full detail, it will be understood that such detail need not be strictly adhered to, but that additional changes and modifications may suggest themselves to one skilled in the art. For example the unit can be provided with a "C" clip to attach the unit to a rod carrier on the front or rear of a land vehicle. These and other changes and modifications are intended to fall within the scope of the invention as defined by the subjoined claims.

What is claimed is:

1. A fishing rod carrier and holder device, comprising:
   a. a support member having a top end, mid section, and a bottom end, said bottom end further comprising a spike portion appointed to be inserted into a ground surface when said fishing rod carrier and holder device is being utilized during a fishing activity;
   b. a first horizontal plate comprising plate sidewalls, a plate front, a plate rear, and a plate portion, said plate portion further comprising a first support aperture and at least two rod holder apertures, said rod holder apertures each further comprising an aperture housing interrupted by an entry port, said entry port extends into said aperture housing from either said plate front or plate rear of said first horizontal plate;
   c. a second horizontal plate comprising lateral walls, a front wall, a back wall, and a plate surface, said plate surface further comprising a second support aperture and at least two rod receiving cavities arranged in parallel longitudinal relation to said rod holder apertures of said first horizontal plate;
   d. said first and second support apertures being appointed to receive said support member,
   e. at least one handle portion arranged to allow said fishing rod carrier and holder device to be carried with said fishing rod therein housed;
   f. said handle portion extends between said first and second horizontal plates so that said fishing rod carrier and holder device is carried in a horizontal orientation, wherein said handle portion comprises a handle grip surface;
   g. said entry port which extends into said aperture housing of said rod holder apertures of said first horizontal plate comprises at least one angled wall portion substantially extending from either said plate front or plate rear into said aperture housing; and
   h. said first horizontal plate and said second horizontal plate comprise hinge portions, said hinge portions being located between said rod holder apertures and said support member;
   wherein said first and second support apertures receive said support member; and wherein said hinge portions allow said plates to be folded against said support member to form a foldable or collapsible fishing rod carrier and holder device.

2. A fishing rod carrier and holder device as recited by claim 1, wherein said support member, said first horizontal plate, said second horizontal plate, and said handle are separable from one another so that said fishing rod carrier and holder device can be disassembled for storage.

3. A fishing rod carrier and holder device as recited by claim 1, wherein said first horizontal plate comprises two to ten rod holder apertures and said second horizontal plate comprises two to ten rod receiving cavities so that said first and second horizontal plates of said fishing rod carrier and holder device are appointed to hold two to ten fishing rods.

4. A fishing rod carrier and holder device as recited by claim 3, wherein said first horizontal plate comprises two to six rod holder apertures and said second horizontal plate comprises two to six rod receiving cavities so that said first and second horizontal plates of said fishing rod carrier and holder device are appointed to hold two to six fishing rods.

* * * * *